ing et al.

United States Patent
Lebrun et al.

(10) Patent No.: US 10,773,552 B2
(45) Date of Patent: Sep. 15, 2020

(54) TIRE TREAD COMPRISING AT LEAST ONE METAL CHELATE AND/OR A PIGMENT

(71) Applicant: COMPAGNIE GENERALE DES ETABLISSEMENTS MICHELIN, Clermont-Ferrand (FR)

(72) Inventors: Xavier Lebrun, Clermont-Ferrand (FR); Didier Vasseur, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/065,399

(22) PCT Filed: Dec. 21, 2016

(86) PCT No.: PCT/EP2016/082230
§ 371 (c)(1),
(2) Date: Jun. 22, 2018

(87) PCT Pub. No.: WO2017/108985
PCT Pub. Date: Jun. 29, 2017

(65) Prior Publication Data
US 2019/0001748 A1    Jan. 3, 2019

(30) Foreign Application Priority Data
Dec. 22, 2015 (FR) .................................. 15 063091

(51) Int. Cl.
*B60C 1/00* (2006.01)
*C08K 5/00* (2006.01)
*C08K 5/3415* (2006.01)
*C08L 21/00* (2006.01)
*C08L 9/06* (2006.01)
*C08K 3/04* (2006.01)
*C08K 3/011* (2018.01)

(52) U.S. Cl.
CPC .......... *B60C 1/0016* (2013.01); *C08K 5/0041* (2013.01); *C08K 5/0091* (2013.01); *C08K 5/3415* (2013.01); *C08L 9/06* (2013.01); *C08L 21/00* (2013.01); *C08K 3/011* (2018.01); *C08K 3/04* (2013.01); *C08K 5/0025* (2013.01); *C08L 2312/02* (2013.01)

(58) Field of Classification Search
CPC .. B60C 1/0016; C08K 5/0041; C08K 5/0091; C08K 5/3415; C08K 3/04; C08K 3/011; C08K 5/0025; C08L 9/06; C08L 21/00; C08L 2312/02

USPC ........................................................ 152/209.1
See application file for complete search history.

(56) References Cited

U.S. PATENT DOCUMENTS

| | | |
|---|---|---|
| 5,977,238 A | 11/1999 | Labauze |
| 6,013,718 A | 1/2000 | Cabioch et al. |
| 6,503,973 B2 | 1/2003 | Robert et al. |
| 6,689,542 B2 | 2/2004 | Boissonnet |
| 6,774,255 B1 | 8/2004 | Tardivat et al. |
| 6,800,683 B1 | 10/2004 | Daude |
| 6,815,473 B2 | 11/2004 | Robert et al. |
| 7,217,751 B2 | 5/2007 | Durel et al. |
| 7,300,970 B2 | 11/2007 | Durel et al. |
| 7,312,264 B2 | 12/2007 | Gandon-Pain |
| 7,488,768 B2 | 2/2009 | Tardivat et al. |
| 7,491,767 B2 | 2/2009 | Durel et al. |
| 7,820,771 B2 | 10/2010 | Lapra et al. |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 9,963,519 B2 | 5/2018 | Kloppenburg et al. |
| 2001/0036991 A1 | 11/2001 | Robert et al. |
| 2002/0089092 A1 | 7/2002 | Boissonnet |
| 2002/0174924 A1* | 11/2002 | Zanzig .................. B60C 1/0016 152/210 |
| 2002/0183436 A1 | 12/2002 | Robert et al. |
| 2004/0051210 A1 | 3/2004 | Tardivat et al. |
| 2004/0132880 A1 | 7/2004 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2007/0051447 A1 | 3/2007 | Kanz et al. |
| 2007/0054993 A1 | 3/2007 | Kanz et al. |
| 2007/0082991 A1 | 4/2007 | Chassagnon |
| 2008/0009569 A1 | 1/2008 | Kanz et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2011/0021702 A1 | 1/2011 | Gandon-Pain et al. |
| 2011/0152458 A1 | 6/2011 | Araujo Da Silva et al. |
| 2012/0208948 A1 | 8/2012 | Gandon-Pain et al. |

(Continued)

FOREIGN PATENT DOCUMENTS

DE      19613801 A1 * 10/1997 ........... B60C 1/0025
EP      1 055 702 A1    11/2000
(Continued)

*Primary Examiner* — Angela C Scott
(74) *Attorney, Agent, or Firm* — Venable LLP

(57) ABSTRACT

A tire tread is based on one or more diene elastomers, on one or more reinforcing fillers, on a crosslinking system, and on at least one compound (A) selected from a metal chelate comprising at least one ligand and at least one metal, a pigment and their mixture.

15 Claims, No Drawings

(56) References Cited

U.S. PATENT DOCUMENTS

2016/0237259 A1* 8/2016 Hardy .................. B60C 1/00
2016/0257770 A1   9/2016 Kloppenburg et al.
2017/0183424 A1   6/2017 Kloppenburg et al.

FOREIGN PATENT DOCUMENTS

| EP | 1127909 A1 | 8/2001 |
|---|---|---|
| FR | 2740778 A1 | 5/1997 |
| FR | 2765882 A1 | 1/1999 |
| JP | 2013-159677 A | 8/2013 |
| WO | 97/36724 A2 | 10/1997 |
| WO | 99/16600 A1 | 4/1999 |
| WO | 00/43213 A1 | 7/2000 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 2004/096865 A1 | 11/2004 |
| WO | 2005/049724 A1 | 6/2005 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2015/055510 A1 | 4/2015 |
| WO | WO-2015059237 A1 * | 4/2015 |

* cited by examiner

TIRE TREAD COMPRISING AT LEAST ONE METAL CHELATE AND/OR A PIGMENT

FIELD OF THE INVENTION

The present invention relates to a tyre tread based on a diene elastomer, a reinforcing filler, a crosslinking system and a specific compound.

RELATED ART

Tyre designers must adhere to strict specifications which stipulate a large number of often contradictory technical requirements. The treads must in particular have a low rolling resistance, a high wear resistance and also a high grip, in particular on wet or damp roads. The combined improvement of these properties remains a constant concern for designers.

In particular, the improvement in the grip gives the tyres a start without wheel spin, and shorter braking distances, which improves the safety of use of these tyres.

For this purpose, the applicant companies have discovered that a novel tyre tread based on a composition comprising a specific compound made it possible to obtain a highly improved grip performance in particular as regards the braking performance.

SUMMARY OF THE INVENTION

One subject of the invention is therefore a tyre tread based on one or more diene elastomers, on one or more reinforcing fillers, on a crosslinking system, and on at least one compound A selected from a metal chelate comprising at least one ligand and at least one metal, a pigment and their mixture.

Another subject of the invention is a process for preparing the tread according to the invention.

Another subject of the invention is a tyre comprising the tread according to the invention.

DETAILED DESCRIPTION OF THE INVENTION

The invention and its advantages will be easily understood in the light of the description and of the exemplary embodiments which follow.

As explained above, the tread according to the invention is based on one or more diene elastomers, on one or more reinforcing fillers, on a crosslinking system and on at least one compound A.

Within the context of the invention, the expression tread "based on" should be understood as meaning a tread comprising the mixture and/or the reaction product of the various constituents used, some of these base constituents being capable of reacting or intended to react with one another, at least in part, during the various phases of production of the tread.

In the present description, unless expressly indicated otherwise, all the percentages (%) are percentages by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "part per hundred parts of elastomer" or "phr" is intended to mean the part by weight of a constituent per 100 parts by weight of the elastomer(s), i.e. of the total weight of the elastomer(s). Thus, a constituent at 60 phr will mean, for example, 60 g of this constituent per 100 g of elastomer.

Within the context of the present invention and in a manner known per se, the expression "metal chelate" is understood to mean a chemical species comprising a metal cation bonded by at least two donor groups borne by a single ligand.

Within the context of the present invention, the expression "pigment" is understood to mean any organic and/or mineral entity, the solubility of which in water is less than 0.01% at 20° C., preferably less than 0.0001%, and having an absorption between 350 and 700 nm, preferably an absorption with a maximum.

Advantageously, the ligand is selected from oxygen-transporting cyclic structures and/or heterocyclic macrocycles that can be combined with metals in their central cavity, preferably cyclic tetrapyrrole derivatives selected from chlorins, bacteriochlorins, porphyrins, hemins and phthalocyanines, more preferably selected from porphyrins and phthalocyanines.

As examples of porphyrin, mention may be made of tetrabenzoporphyrins and tetraazaporphyrins.

Preferably, the metal is selected from copper, cobalt and iron, preferably iron.

Preferably, the metal chelate is selected from iron porphyrins, preferably iron porphines, iron hemiporphyrazine, iron hemin, iron phthalocyanines and copper phthalocyanines.

As an example of copper phthalocyanine, mention may be made of the pigment green 7-PG.

According to one particular embodiment of the invention, said metal chelate is iron hemin of formula (I) below:

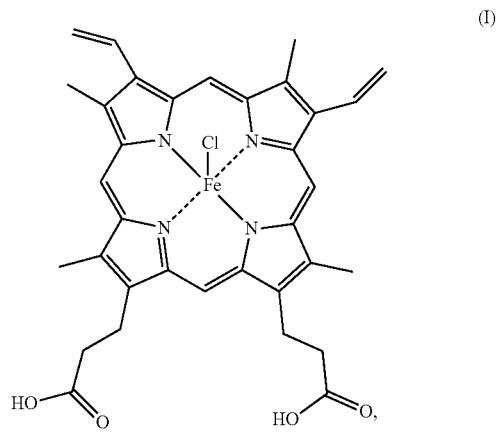

or iron phthalocyanine of formula (II) below:

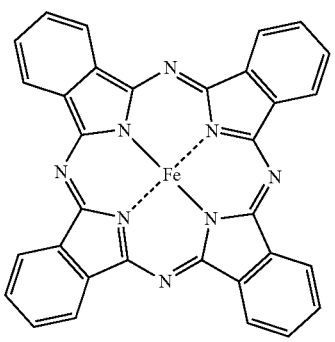

(II)

Advantageously, the pigment is selected from diketopyrrolopyrroles, anthraquinones, quinacridones, perylenes and pyrazolo-quinazolones, preferably diketopyrrolopyrroles.

Preferably, the pigment is selected from Red 254, Red 255, Red 257 and Red 264, preferably Red 254.

According to one particular embodiment of the invention, the pigment is different from the metal chelate as defined previously.

Advantageously, the compound A represents from 1 to 30 phr, preferably from 5 to 20 phr.

Diene elastomer should be understood, in a known way, as an elastomer resulting at least in part, that is to say a homopolymer or a copolymer, from diene monomers.

In a way known per se, a diene monomer is a monomer comprising two conjugated or non-conjugated carbon-carbon double bonds.

The diene elastomer(s) of the tread according to the invention can be classified into two categories: "essentially unsaturated" or "essentially saturated".

"Essentially unsaturated" is generally understood to mean a diene elastomer resulting at least in part from conjugated diene monomers, having a content of moieties or units resulting from a conjugated diene which is greater than 15 mol %.

"Highly unsaturated" diene elastomer is understood in particular to mean a diene elastomer having a content of moieties or units resulting from a conjugated diene which is greater than 50 mol %.

Conversely, "essentially saturated" is generally understood to mean a diene elastomer resulting at least in part from conjugated diene monomers, having a content of moieties or units resulting from a conjugated diene which is less than or equal to 15 mol %.

It is because of this that diene elastomers such as some butyl rubbers or copolymers of dienes and of α-olefins of EPDM type can be described as "essentially saturated" diene elastomers.

The diene elastomer(s) of the tread according to the invention are preferably selected from essentially unsaturated diene elastomers and the mixtures of these elastomers.

Essentially unsaturated diene elastomer is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as especially 1,4-hexadiene, ethylidenenorbornene or dicyclopentadiene, (d) the mixtures of these polymers.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

When the essentially unsaturated diene elastomer or elastomers are chosen from the copolymers obtained by copolymerization of one or more conjugated dienes with one another or with one or more vinylaromatic compounds having from 8 to 20 carbon atoms, these can contain between 99% and 20% by weight of conjugated diene units and between 1% and 80% by weight of vinylaromatic units.

The diene elastomers of the tread according to the invention can have any microstructure, which depends on the polymerization conditions used, especially on the presence or absence of a modifying and/or randomizing agent and on the amounts of modifying and/or randomizing agent employed.

The diene elastomers of the tread according to the invention can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973).

Mention may also be made, as other examples of functionalized elastomers, of elastomers (such as SBR, BR, NR or IR) of the epoxidized type.

As diene elastomer of the tread according to the invention, polybutadienes and in particular those having a content (mol %) of 1,2-units of between 4% and 80% or those having a content (mol %) of cis-1,4-units of greater than 80%, polyisoprenes, butadiene/styrene copolymers and in particular those having a glass transition temperature, Tg, (measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −25° C. and −50° C., are suitable. In the case of butadiene/styrene/ isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50% are especially suitable, and more generally any butadiene/styrene/isoprene copolymer having a Tg of between −20° C. and −70° C.

The diene elastomer(s) of the tread according to the invention can most particularly be selected from isoprene elastomers.

"Isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers.

Mention will in particular be made, among the isoprene copolymers, of isoprene/styrene (SIR), isoprene/butadiene (BIR) or isoprene/butadiene/styrene (SBIR) copolymers.

Preferably, the isoprene elastomers are chosen from natural rubber and synthetic cis-1,4-polyisoprene.

Use is preferably made, among synthetic polyisoprenes, of polyisoprenes having a content (mol %) of cis-1,4-bonds of greater than 90%, more preferentially still of greater than 98%.

Preferably, the diene elastomer(s) of the tread according to the invention are selected from homopolymers obtained by polymerization of a conjugated diene monomer having from 4 to 12 carbon atoms, copolymers obtained by copolymerization of one or more conjugated diene monomers with one another or with one or more vinylaromatic compounds having from 8 to 20 carbon atoms, and the mixtures of these polymers.

The diene elastomer(s) are particularly preferably selected from polybutadienes (abbreviated to "BRs"), natural rubber (NR), synthetic polyisoprenes (IRs), butadiene copolymers, isoprene copolymers and the mixtures of these elastomers. Mention may be made, in particular, of butadiene/styrene copolymers (SBRs), isoprene/butadiene copolymers (BIRs), isoprene/styrene copolymers (SIRs) and isoprene/butadiene/styrene copolymers (SBIRs).

The content of diene elastomers in the tread according to the invention generally varies from 50 to 100 phr, preferably from 70 to 100 phr and, more preferentially, all the elastomers of the tread are diene elastomers (100 phr).

As stated above, the tread according to the invention also comprises a crosslinking system.

The crosslinking system can be a vulcanization system. In this case, it is preferentially based on sulfur or based on a sulfur donor and on a primary vulcanization accelerator.

Mention may be made, among sulfur donors, for example, of alkylphenol disulfides (APDSs), such as, for example, para-(tert-butyl)phenol disulfide.

The sulfur is used at a preferential content ranging from 0.5 to 10 phr, more preferentially ranging from 0.5 to 5 phr, in particular from 0.5 to 3 phr.

Use may be made, as primary accelerator, of any compound capable of acting as accelerator for the vulcanization of diene elastomers in the presence of sulfur, especially accelerators of the thiazole type, and also their derivatives, or accelerators of thiuram or zinc dithiocarbamate type. These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds.

Preferably, use is made of a primary accelerator of the sulfenamide type.

The primary vulcanization accelerator must enable crosslinking of the treads within industrially acceptable times, while retaining a minimum safe time ("scorch time") during which the treads can be shaped without risk of premature vulcanization ("scorching").

Various known secondary vulcanization accelerators or vulcanization activators, such as zinc oxide, stearic acid or equivalent compounds, or guanidine derivatives (in particular diphenylguanidine), may be added to this base vulcanization system.

The content of each primary or secondary vulcanization accelerator and of each vulcanization activator generally varies from 0.5 to 5.0 phr.

The tread according to the invention also comprises at least one reinforcing filler.

Use may be made of any type of reinforcing filler known for its abilities to reinforce a tread, for example an organic filler, such as carbon black, a reinforcing inorganic filler, such as silica, or else a blend of these two types of filler, especially a blend of carbon black and silica.

All carbon blacks, especially blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in the isoprene elastomer in the form of a masterbatch (see, for example, applications WO 97/36724 or WO 99/16600).

Mention may be made, as examples of organic fillers other than carbon blacks, of functionalized polyvinylaromatic organic fillers, such as described in applications WO-A-2006/069792 and WO-A-2006/069793.

The term "reinforcing inorganic filler" should be understood, in the present application, by definition, as meaning any inorganic or mineral filler, in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers.

Preferably, the reinforcing filler(s) are selected from silica, carbon black and their mixture, and more preferably the reinforcing filler is carbon black.

The reinforcing filler(s) (carbon black and/or reinforcing inorganic filler, such as silica) are preferentially present at a content ranging from 20 to 200 phr, preferably from 30 to 150 phr, more preferably from 40 to 80 phr.

The optimum, in a known way, is different according to the specific applications targeted: the expected level of reinforcement with regard to a bicycle tyre, for example, is, of course, lower than that required with regard to a tyre capable of running at high speed in a sustained manner, for example a motorcycle tyre, a tyre for a passenger vehicle or a tyre for a utility vehicle, such as a heavy-duty vehicle.

According to one embodiment of the invention, a reinforcing filler comprising between 30 and 150 phr, more preferentially between 30 and 120 phr of organic filler, particularly of carbon black, is used.

When the reinforcing filler comprises a filler requiring the use of a coupling agent in order to establish the bond between the filler and the diene elastomer, the tread also conventionally comprises an agent capable of effectively providing this bond. When silica is present in the tread as reinforcing filler, use is made, in a known manner, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is especially made of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides referred to as "symmetrical", corresponding to the following general formula (II):

$$Z\text{-}A\text{-}S_x\text{-}A\text{-}Z \qquad (II)$$

in which:
x is an integer from 2 to 8, preferably from 2 to 5;
A is a divalent hydrocarbon-based radical, preferably $C_1$-$C_{18}$ alkylene groups or $C_6$-$C_{12}$ arylene groups, more particularly $C_1$-$C_{10}$, especially $C_1$-$C_4$, alkylenes, in particular propylene;
Z corresponds to one of the formulae below:

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group, preferably represent $C_1$-$C_6$ alkyl, cyclohexyl or phenyl groups, especially $C_1$-$C_4$ alkyl groups, and more particularly represent methyl and/or ethyl,
the $R^2$ radicals, which are substituted or unsubstituted and identical to or different from one another, represent a $C_1$-$C_{18}$ alkoxyl or $C_5$-$C_{18}$ cycloalkoxyl group, preferably represent a group selected from $C_1$-$C_8$ alkoxyls and $C_5$-$C_8$ cycloalkoxyls, more preferentially still represent a group selected from $C_1$-$C_4$ alkoxyls, and in particular represent a methoxyl and ethoxyl group.

In the case of a mixture of alkoxysilane polysulfides corresponding to the above formula (II), especially common commercially available mixtures, the mean value of the "x" indices is a fractional number, preferably ranging from 2 to 5, more preferentially of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl)) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880).

Mention will especially be made, as coupling agent other than an alkoxysilane polysulfide, of bifunctional POSs (polyorganosiloxanes) or else of hydroxysilane polysulfides ($R^2$=OH in the above formula I), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the tread according to the invention, the content of coupling agent preferentially varies from 0.5 to 12 phr, it being understood that it is in general desirable to use as little as possible thereof. The presence of the coupling agent depends on the presence of the reinforcing inorganic filler other than carbon black. Its content is easily adjusted by those skilled in the art according to the content of this filler; it is typically of the order of 0.5% to 15% by weight, with respect to the amount of reinforcing inorganic filler other than carbon black.

Those skilled in the art will understand that, as filler equivalent to the reinforcing inorganic filler other than carbon black, a reinforcing filler of another nature might be used, provided that this reinforcing filler is covered with an inorganic layer, such as silica, or else comprises functional sites, especially hydroxyl sites, at its surface requiring the use of a coupling agent in order to form the bond between the filler and the diene elastomers.

The tread according to the invention can also comprise reinforcing organic fillers which can replace all or a portion of the carbon blacks or of the other reinforcing inorganic fillers described above. Mention may be made, as examples of reinforcing organic fillers other than carbon blacks, of functionalized polyvinyl organic fillers, such as described in Applications WO-A-2006/069792, WO-A-2006/069793, WO-A-2008/003434 and WO-A-2008/003435.

The tread according to the invention may comprise various additives commonly known to those skilled in the art. Mention will be made, for example, of non-reinforcing or inert fillers, plasticizers, tackifying resins, protection agents, such as antioxidants or antiozonants, UV stabilizers, various processing aids or other stabilizing agents, or else promoters capable of promoting the adhesion to the remainder of the structure of the tyre.

In the case in which the tread comprises a plasticizer, the content is preferentially less than 100 phr, and more preferentially for an application in tread underlayer, the content of plasticizer is less than 20 phr, more preferentially less than 10 phr.

Another subject of the invention is a process for preparing the tread according to the invention, comprising the following steps:

a) incorporating said compound A and the reinforcing filler(s) into the diene elastomer or said diene elastomers, everything being kneaded thermomechanically, once or several times, until a maximum temperature ranging from 110° C. to 165° C. is reached, then b) incorporating the crosslinking system into the mixture and kneading everything up to a maximum temperature of less than 90° C.

Alternatively, the compound A may be incorporated during the above step b).

Preferably, said process further comprises a step c) of calendering the mixture obtained at the end of step b).

The tread according to the invention is generally manufactured in appropriate mixers, firstly using two successive phases of preparation well known to those skilled in the art: a first phase of thermomechanical working or kneading ("non-productive" phase) at high temperature, up to a maximum temperature of between 110° C. and 165° C., preferably between 130° C. and 165° C., followed by a second phase of mechanical working ("productive" phase) down to a lower temperature, typically of less than 90° C., for example between 40° C. and 90° C., during which finishing phase the crosslinking system is incorporated.

The tread is then obtained by calendering.

The invention also relates to a tyre comprising a tread as above and also to the use of said tread for improving the grip of a tyre as defined above, on wet roads.

EXAMPLES

Tests Used

Grip Performance Under Braking on Wet Ground:

The compositions below (A, B and C) are used as treads of radial carcass passenger vehicle tyres. The tyres are denoted respectively as P-A (control tyres), P-B and P-C (tyres according to the invention), with dimensions of 225/55R16, conventionally manufactured and identical in every respect except for the constituent rubber compositions of their tread. The tyres are fitted, at the front and at the rear, under nominal inflation pressure, to a motor vehicle of the "BMW" make, 530 model, equipped with an ABS system.

The tyres are subjected to a test of braking on wet ground at two different speeds (at 90 km/h and at 30 km/h) that consists in measuring the distance required to come to a stop from 90 km/h (or 30 km/h in the case) during sudden braking in a straight line, on bituminous concrete with a 1 mm film of water, at ambient temperature. A value greater than that of the control, arbitrarily set at 100, indicates an improved result, that is to say a shorter braking distance. The results obtained are shown in Table 2 below.

Preparation of the Treads

1) Process for Preparing the Treads

The mixtures for treads are prepared in appropriate mixers using two successive preparation phases according to a general procedure well known to those skilled in the art.

The diene elastomer(s), the optional pigment or optional metal chelate, and the reinforcing filler(s), and then, after kneading for one to two minutes, the various other ingredients, with the exception of the crosslinking system, are introduced into an internal mixer which is 70% filled and which has an initial vessel temperature of approximately 90° C. Thermomechanical working is then carried out (non-productive phase) in one step (total duration of the kneading equal to approximately 5 min), until a maximum "dropping" temperature of approximately 165° C. is reached. The mixture thus obtained is recovered and cooled and then the crosslinking system is added on an external mixer (homofinisher) at 70° C., everything being mixed (productive phase) for approximately 5 to 6 min.

In this instance, the processing is carried out by means of a mixer of the Haake RM 3000 type of 360 cm$^3$ with blades of CAM type.

The mixtures thus obtained are then calendered in the form of a tread.

2) Formulation of the Treads

Two treads according to the invention (treads B and C) and a comparative tread (tread A) were prepared using the ingredients and contents presented in Table 1 below. The contents are expressed in phr.

TABLE 1

| Tread | A (Comp) | B (Inv) | C (Inv) |
| --- | --- | --- | --- |
| Natural rubber | 40 | 40 | 40 |
| Styrene butadiene rubber[1] | 40 | 40 | 40 |
| Butadiene rubber[2] | 20 | 20 | 20 |
| Carbon black[3] | 54 | 54 | 54 |
| Stearic acid | 2 | 2 | 2 |
| ZnO | 2 | 2 | 2 |
| Antioxidant[4] | 2 | 2 | 2 |
| Sulfur | 1.1 | 1.1 | 1.1 |
| Vulcanization accelerator[5] | 1.1 | 1.1 | 1.1 |
| Paraffin | 1 | 1 | 1 |
| Pigment[6] | — | 10 | — |
| Metal chelate[7] | — | — | 10 |

[1]Styrene-butadiene copolymer,
[2]Polybutadiene with 4% of 1,2-units and 93% of cis-1,4-units (Tg = −106° C.),
[3]Carbon black N234,
[4]N-(1,3-Dimethylbutyl)-N'-phenyl-p-phenylenediamine, 6-PPD, from Flexsys,
[5]N-Cyclohexyl-2-benzothiazolesulfenamide, Santocure CBS, from Flexsys,
[6]RED 254
[7]HEMIN Results The mechanical properties are presented in Table 2.

TABLE 2

| Tread | A (Comp) | B (Inv) | C (Inv) |
| --- | --- | --- | --- |
| Braking at 30 km/h | 100 | 105 | 105 |
| Braking at 90 km/h | 100 | 102 | 101 |

The results presented in Table 2 above demonstrate that the treads B and C according to the invention enable a notable improvement in braking at low speed, and at high speed, of the tyres P-B and P-C containing them.

The invention claimed is:

1. A tire tread based on:
   one or more diene elastomers;
   a reinforcing filler, wherein the reinforcing filler is carbon black;
   a crosslinking system; and
   at least one compound A selected from the group consisting of a metal chelate comprising at least one ligand and at least one metal, a pigment and the mixture thereof,
   wherein the metal chelate is selected from the group consisting of iron porphyrins, iron hemin, and copper phthalocyanines;
   wherein the pigment is selected from the group consisting of diketopyrrolopyrroles, anthraquinones, quinacridones, perylenes and pyrazolo-quinazolones; and
   wherein compound A is present at a content from 1 to 30 phr.

2. The tread according to claim 1, wherein the metal chelate is iron porphines.

3. The tread according to claim 1, wherein the metal chelate is iron hemin of formula (I) below:

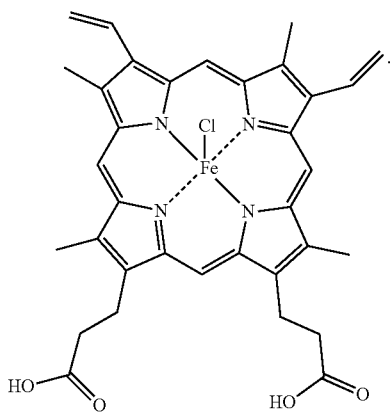

(I)

4. The tread according to claim 1, wherein the pigment is a diketopyrrolopyrrole.

5. The tread according to claim 1, wherein the pigment is selected from the group consisting of Red 254, Red 255 and Red 264.

6. The tread according to claim 5, wherein the pigment is Red 254.

7. The tread according to claim 1, wherein compound A is present at a content from 5 to 20 phr.

8. The tread according to claim 1, wherein the one or more diene elastomer is selected from the group consisting of polybutadienes, natural rubber, synthetic polyisoprenes, butadiene copolymers, isoprene copolymers and mixtures thereof.

9. The tread according to claim 1, wherein the reinforcing filler is present at a content ranging from 20 to 200 phr.

10. The tread according to claim 9, wherein the reinforcing filler is present at a content ranging from 30 to 150 phr.

11. The tread according to claim 10, wherein the reinforcing filler is present at a content ranging from 40 to 80 phr.

12. A process for preparing a tread according to claim 1 comprising the steps of:
    (a) incorporating compound A and the reinforcing filler into the one or more diene elastomer to make a mixture and kneading the mixture thermomechanically until a maximum temperature ranging from 110° C. to 165° C. is reached; then
    (b) incorporating the crosslinking system into the mixture and kneading until a maximum temperature of less than 90° C.

13. The process according to claim 12 further comprising the step of:
    (c) calendering the mixture obtained at the end of step (b).

14. A tire comprising a tread according to claim 1.

15. A method of improving the grip of a tire on wet roads comprising the step of:
    incorporating a tread according to claim 1 in the tire.

* * * * *